United States Patent
Prouzet

(10) Patent No.: US 11,946,516 B2
(45) Date of Patent: Apr. 2, 2024

(54) BRAKE WITH DUST RETAINING ASSEMBLY

(71) Applicant: Ratier-Figeac SAS, Figeac (FR)

(72) Inventor: Bertrand Prouzet, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 17/953,479

(22) Filed: Sep. 27, 2022

(65) Prior Publication Data
US 2023/0017901 A1 Jan. 19, 2023

Related U.S. Application Data

(62) Division of application No. 16/059,428, filed on Aug. 9, 2018, now Pat. No. 11,480,224.

(30) Foreign Application Priority Data

Nov. 7, 2017 (EP) .................................... 17306539

(51) Int. Cl.
*F16D 65/12* (2006.01)
*F16D 55/24* (2006.01)
(Continued)

(52) U.S. Cl.
CPC ......... *F16D 65/0031* (2013.01); *F16D 55/24* (2013.01); *F16D 65/0081* (2013.01);
(Continued)

(58) Field of Classification Search
CPC ....... F16D 2065/132; F16D 2065/1324; F16D 2065/1356; F16D 2065/1368; F16D 65/0031; F16D 65/0081
See application file for complete search history.

(56) References Cited

U.S. PATENT DOCUMENTS 1,936,029 A * 11/1933 Ruesenberg ............ F16D 13/71
192/DIG. 1
3,724,612 A * 4/1973 Spain .................... F16D 65/122
188/218 XL
(Continued)

FOREIGN PATENT DOCUMENTS

CA 3024763 A1 11/2017
JP 2008196631 A 8/2008
(Continued)

OTHER PUBLICATIONS

Extended European Search Report for International Application No. 17306539.2 dated Apr. 30, 2018, 12 pages.

*Primary Examiner* — Bradley T King
(74) *Attorney, Agent, or Firm* — CANTOR COLBURN LLP

(57) ABSTRACT

A dust retainer for a brake system comprising a retainer receptacle mounted integrally to one or more components of the brake assembly, wherein the retainer receptacle comprises a drum have first and second open ends, one open end being secured to a component of the brake system and the other open end being closed by a dust retainer cap, the drum defining a space within which a brake disk of the brake system is located, in use, wherein removal of the dust retainer cap allows the brake disk to be removed from the open end of the retainer drum, and a removable drawer integrated in the drum. A fastening means to removably secure brake components to each other is also disclosed.

1 Claim, 15 Drawing Sheets

(51) Int. Cl.
*F16D 65/00* (2006.01)
*F16D 55/00* (2006.01)
*F16D 69/04* (2006.01)

(52) U.S. Cl.
CPC ............ *F16D 2055/0058* (2013.01); *F16D 2069/0433* (2013.01); *F16D 2250/0084* (2013.01)

(56) References Cited

U.S. PATENT DOCUMENTS

| | | | |
|---|---|---|---|
| 4,326,614 A | 4/1982 | Matagrano | |
| 4,369,862 A * | 1/1983 | Seki | F16D 65/0977 188/73.32 |
| 4,473,139 A | 9/1984 | Oka | |
| 4,817,775 A * | 4/1989 | Baccalaro | F16D 13/46 192/96 |
| 4,941,344 A * | 7/1990 | Beech | B21D 37/10 403/338 |
| 5,293,967 A | 3/1994 | Siegrist | |
| 5,501,010 A * | 3/1996 | Scott | F04D 19/002 29/889.3 |
| 5,671,827 A | 9/1997 | Demetriou | |
| 5,685,407 A * | 11/1997 | Rudolph | F16D 1/112 464/92 |
| 5,855,471 A | 1/1999 | Chory | |
| 6,077,042 A | 6/2000 | Pancotti | |
| 6,592,642 B2 | 7/2003 | Maricq | |
| 9,677,627 B2 | 6/2017 | Kunzler et al. | |
| 11,022,192 B2 * | 6/2021 | White | B60T 8/17 |
| 2003/0102710 A1 * | 6/2003 | Thorp | F16D 55/36 301/6.1 |
| 2006/0151276 A1 * | 7/2006 | Jurgensmeyer | H02K 49/046 192/84.1 |
| 2010/0065387 A1 | 3/2010 | Tsiberidis | |
| 2011/0031088 A1 * | 2/2011 | Settles | F16D 65/12 192/18 R |
| 2014/0262633 A1 | 9/2014 | Kunzler et al. | |
| 2015/0060218 A1 * | 3/2015 | Liu | F16D 65/12 188/218 XL |
| 2016/0025162 A1 | 1/2016 | Morse | |
| 2017/0248180 A1 | 8/2017 | Metayer | |
| 2019/0136921 A1 | 5/2019 | Prouzet | |
| 2019/0136927 A1 | 5/2019 | Prouzet | |
| 2019/0136928 A1 | 5/2019 | Prouzet | |
| 2019/0136977 A1 | 5/2019 | Prouzet | |
| 2022/0212496 A1 * | 7/2022 | Kelvin | B60B 27/0052 |

FOREIGN PATENT DOCUMENTS

| | | |
|---|---|---|
| JP | 2008196684 A | 8/2008 |
| JP | 2017116013 A | 6/2017 |
| WO | 2013032136 A1 | 3/2013 |
| WO | 2017201583 A1 | 11/2017 |

\* cited by examiner

BRAKE WITH DUST RETAINING ASSEMBLY

CROSS REFERENCE TO RELATED APPLICATIONS

This application is a division of U.S. application Ser. No. 16/059,428 filed Aug. 9, 2018, which claims priority to European Patent Application No. 17306539.2 filed Nov. 7, 2017, the entire contents of which is incorporated herein by reference.

TECHNICAL FIELD

The present disclosure is concerned with a brake assembly and an assembly for retaining dust created by operation of a rotor brake system and for allowing simplified disassembly.

BACKGROUND

Brake system such as found on vehicles and the like generally comprise a brake rotor disk that rotates with the wheel or component to be braked, and a brake caliper fixed relative to the rotor disk. To brake rotation of the wheel or the like, usually in response to actuation of a lever, the caliper presses or squeezes the brake disk to slow or prevent its further rotation. Such brake systems are also found in helicopters for braking rotation of the helicopter rotor.

Often, dust or debris is created and/or sparks are caused during the braking operation due, e.g. to friction between the brake system materials. The brake system components can also become damaged or contaminated by external influences e.g. rust.

In many cases, e.g. in helicopter rotor brakes, the brake assembly is mounted in close proximity to other parts, motors etc., in a confined space, and sparks can damage or set fire to these other parts. Problems can also arise if hot braking fluid contacts hot disks in the event of leakage. Also, if a disk shatters or breaks, debris from the disk can cause damage to the system.

A solution to these problems has been to provide a dust retaining cover or box around the brake system e.g. in the form of a shroud or case enclosing the brake disk, brake caliper and other brake system components. The dust and sparks generated by braking are thus retained and prevented from spreading. At appropriate maintenance intervals, the dust box can be removed, e.g. by unscrewing nuts/fasteners that secure the box around the brake system, the inside of the box can then be emptied/cleaned.

Removing the dust box can, however, be difficult and take a long time especially in constrained spaces where brakes are usually installed. It can be easy to drop a screw or the like into an inaccessible area or somewhere where the screw can cause damage to the brake system or other systems. It is also difficult to ensure that all fasteners have been secured when the dust box is reassembled. A further problem is that the presence of a dust box around the brake system makes it difficult to access the brake components for repair, maintenance, removal and the like.

These problems are particularly problematic in helicopter rotor brakes where the brake system is usually installed on the helicopter upper deck where many other systems are also installed, making the area crowded and difficult to access. This makes it difficult and time-intensive to access the dust box itself and also the brake components inside the dust box.

The present disclosure aims to provide an improved dust retaining assembly for a brake system, that overcomes or reduces the above problems, and also to provide an improved way of dismantling brake disks.

SUMMARY

According to this disclosure there is provided a dust retainer for a brake system comprising a retainer receptacle removably mounted integrally to one or more components of the brake assembly.

In a preferred embodiment, the retainer receptacle is a drawer removably fitted to the caliper formed around the brake components.

In an embodiment, the retainer receptacle comprises a drum having first and second open ends, one open end being secured to a component of the brake system and the other open end being closed by a cap, the drum defining a space within which a brake disk of the brake system is located, in use. A removable receptacle or drawer is formed in the drum.

Preferably the brake system comprises a caliper body and a shaft to which the brake disk is mounted to rotate relative to the caliper support body, the caliper is actuated to compress the brake disk in a brake operation.

The compression may be caused by operation of one or more brake shoes or pads pressing against the brake disk or one or more caliper disks pressing against the brake disk.

In the preferred arrangement, removal of the cap allows the brake disk to be removed from the open end of the retainer drum.

The disclosure also provides a brake system comprising a brake disk and a brake caliper to press against the disk during a braking operation, and a dust retainer integrally mounted with the brake caliper.

In a second aspect, there is provided a brake assembly comprising two or more disk components removably mounted about an axis, the assembly comprising fastening means for securing said two or more components together for rotation together about the axis, said fastening means configured to enable the components to be separated from each other by rotating one component relative to the other and then axially moving one component away from the other.

Preferably the fastening means comprises a spline arranged on one component and a corresponding recess on the other component arranged to receive the spline such as to define a gap between the spline and an edge of the recess, and further comprising a locking axis arranged to engage in the gap to prevent relative rotation of the components.

Preferably the fastening means comprises a pin arranged on one component and a slot arranged on the other component, the pin having a shaft and an enlarged head, the slot comprising a first portion having a diameter larger than the head and a second portion smaller than the head, whereby the components are axially secured to each other by engaging the pin with the slot and rotating the pin and slot relative to each other to secure the pin in the second portion.

Preferred embodiments will now be described, by way of example only, with reference to the accompanying drawings.

DETAILED DESCRIPTION

An embodiment of the integrated dust retaining assembly will now be described with respect to the figures. The embodiments described are for a rotary brake system such as used to brake rotation of a helicopter rotor. The concept of the disclosure can, however, be applied to other types of brake system.

Figure 1:
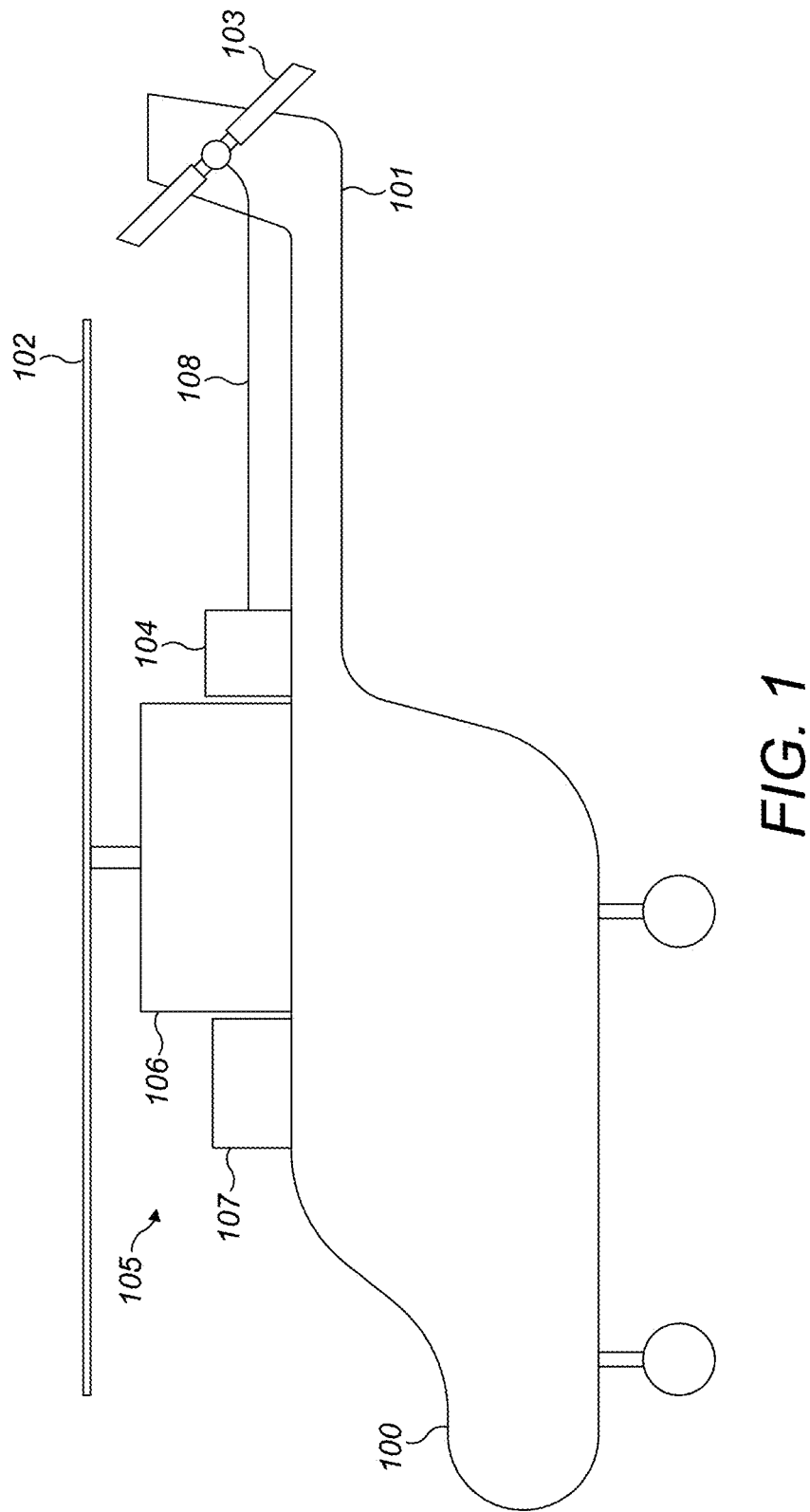
FIG. 1 is a schematic view of a helicopter with a rotor brake.

FIG. 1 shows a schematic view of a rotor brake for a helicopter rotor.

The figure shows the helicopter 100 having a tail 101 and a rotor 102. The tail is also provided with a rotor 103.

The rotor brake 104 is typically mounted in the upper deck area 105 of the helicopter along with other system components e.g. a main gear box 106 and a motor 107. A shaft 108 connects the gear box 106 to the tail rotor 103. Brake 104 is connected to shaft 108.

Figure 2:
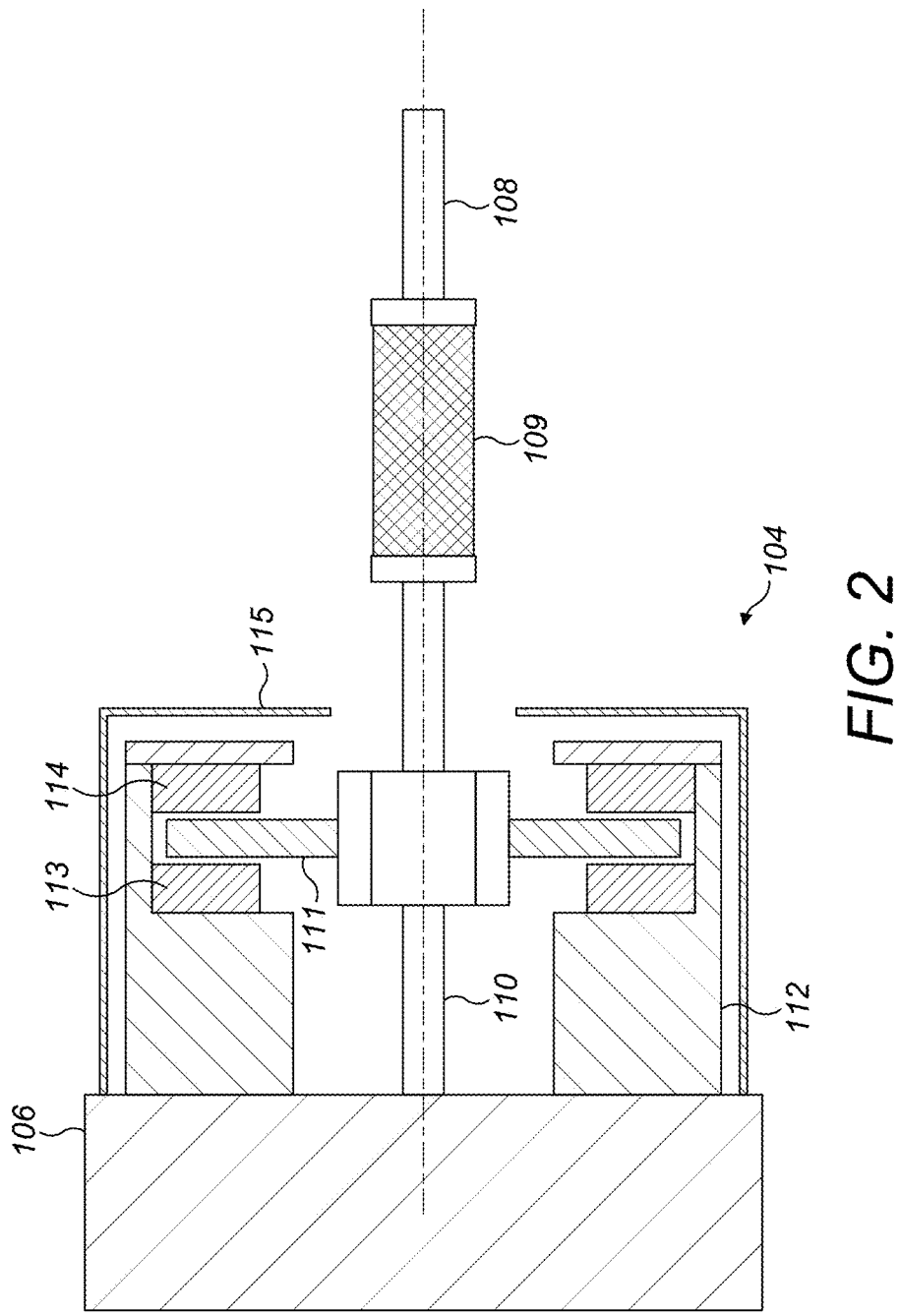
FIGS. 2 and 2A are cross-sectional views of a conventional rotor brake.

FIG. 2 is a cross-sectional view of a conventional rotor brake 104. Although described in the context of a helicopter rotor brake, this is not intended to be limiting and such a brake can, of course, have other applications.

The rotor brake assembly is mounted to the tail rotor shaft 108 via a flexible connection 109 and engages with the rotor 102 or other component to be braked, via the main gear box 106, to which it is connected via a main gear box shaft 110.

The brake assembly comprises a floating disk 111 mounted to the shafts 108, 110 to rotate with the rotor 102, 103.

A caliper 112 is mounted about the floating disk 111. The caliper 112 comprises brake disks or pads 113, 114 which are, in normal operation, biased to be spaced from the floating disk and which are actuable, in a braking operation, to press against the floating disk 111 to stop it rotating, or to slow its rotation, thus stopping or slowing rotation of the rotors 102, 103.

Figure 2A:
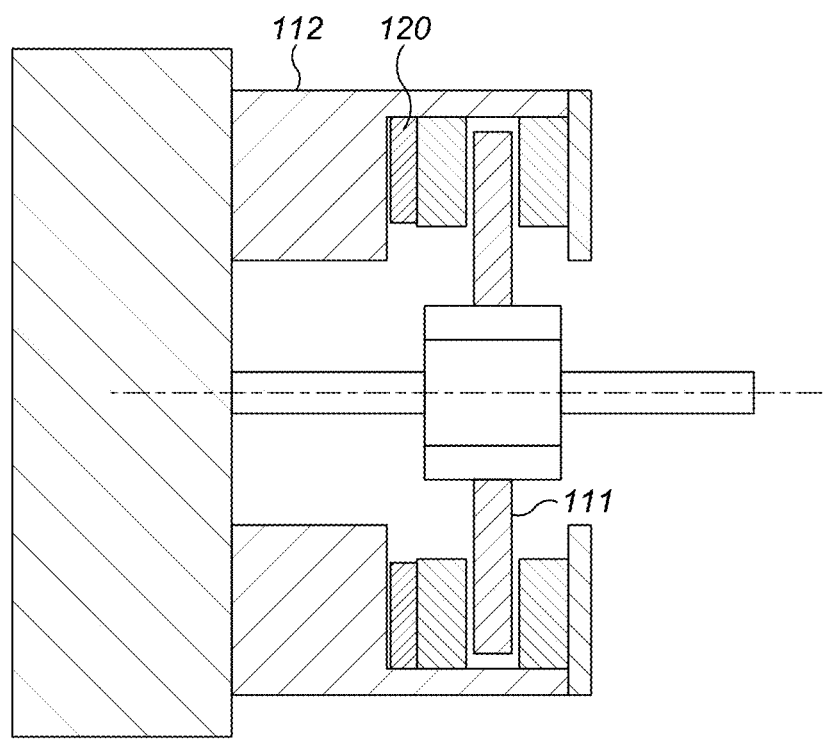

In the embodiment shown in FIG. 2, one set of pads 114 is fixed to the caliper cover or support, adjacent one face of the floating disk 111. A second set of pads, adjacent the opposite face of the floating disk 111, is moveable relative to the fixed pads 114 e.g. by means of pistons (not shown) or electrical actuator (not shown), which may be responsive to actuation of a brake lever or control. On braking, the moveable pads 113 are pushed towards the fixed pads 114, squeezing the floating disk 111 between them. In other embodiments, as shown in FIG. 2A, a pushing plate 120 may be provided to which the moveable pads 113 are mounted, and the pushing plate is moved by the pistons.

As mentioned above, conventionally, to contain dust and/or sparks, a dust box 115 is mounted about the brake assembly, encasing the rotor brake 104.

Figure 3:
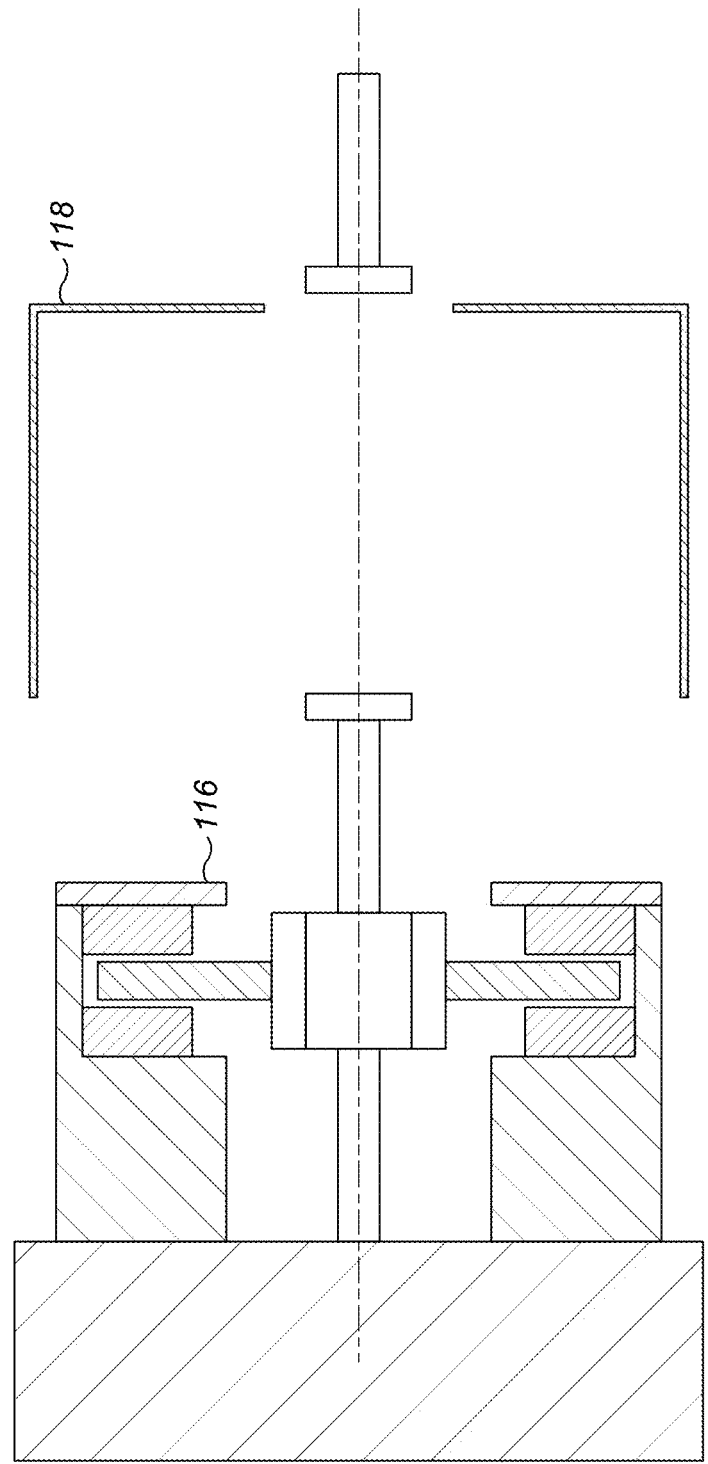
FIGS. 3 and 4 show stages of disassembling a conventional rotor brake.

To access and/or disassemble the brake components in the conventional system, it is first necessary to dismantle the tail rotor shaft 108 after disconnecting the flexible connection 109, and then to remove the dust box 115 (FIG. 3). Only then can the dust box be emptied/cleaned etc. The caliper cover 116, to which one set of the brake pads 114 may be mounted, can then be removed if access to the brake components is required and the brake disks can then be disassembled.

In such conventional systems, the dust box can only be removed by removing the tail rotor shaft, which requires disconnecting the flexible connection. Removing the flexible connection may take around one hour, and removing the tail rotor shaft may take around one day. It is, therefore, a time-intensive operation to remove/empty the dust box and, if necessary, access the brake disks/pads or remove the entire brake, meaning substantial downtime for the helicopter etc.

Removal of the brake disks/pads themselves from the brake assembly is also, in conventional systems, difficult and time-intensive.

The tail rotor shaft is removed, after which the brake assembly 104 can be removed over the gear shaft. The brake assembly can then be dismantled by unscrewing the caliper and the disks/pads.

Figure 5:
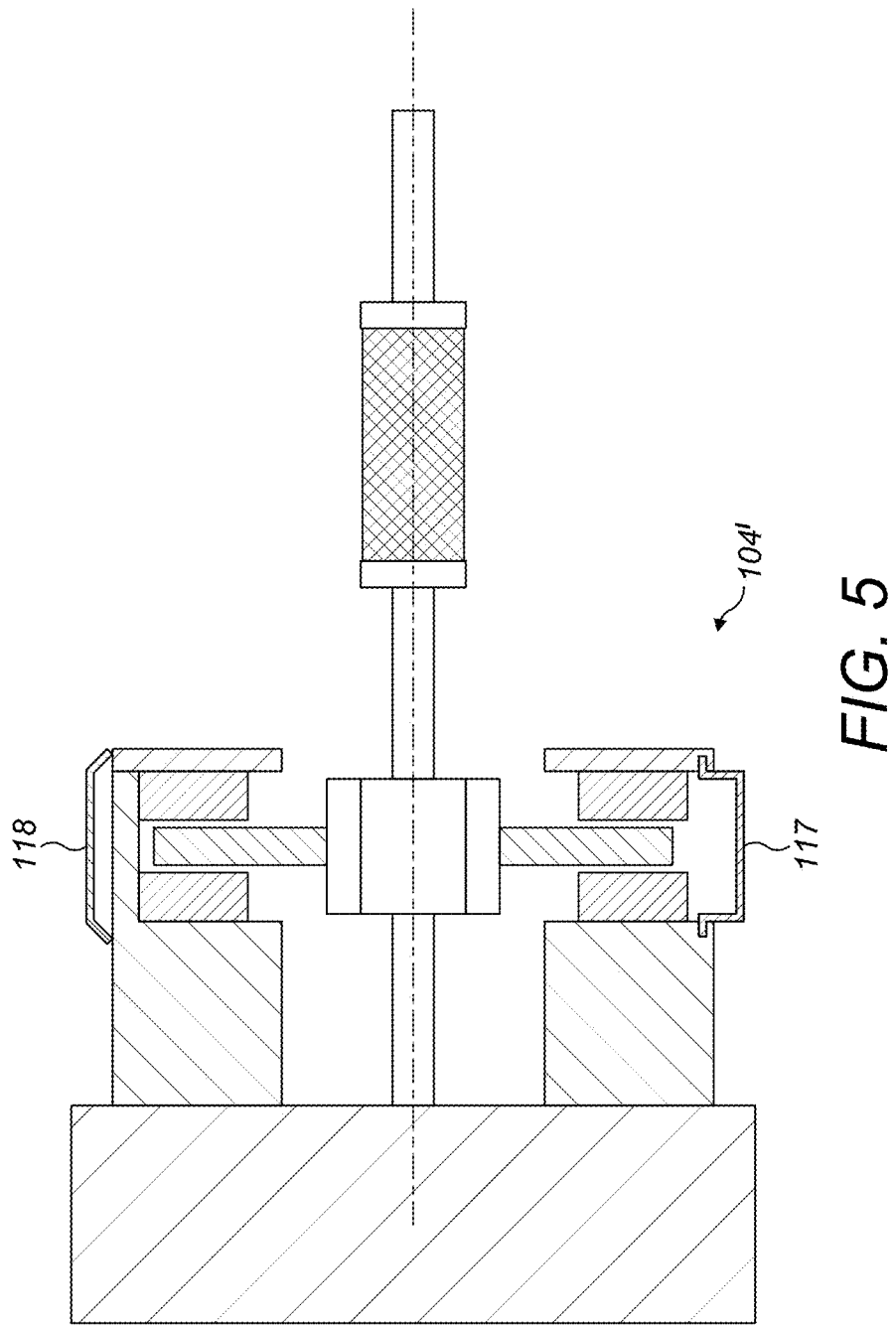
FIG. 5 is a cross-sectional view of a rotor brake according to the disclosure.

The modified brake 104' of the present disclosure, e.g. as shown in FIG. 5, avoids the need for the time-intensive disassembly of conventional systems to remove collected dust from the system.

Instead of a dust box 115 mounted around, or encasing the rotor brake 104, a dust collection receptacle 117 is integrated into the rotor brake 104' itself. As can be seen in FIG. 5, the receptacle is preferably in the form of a drawer 117 removably integrated into the brake caliper 115 in the area of (preferably below) the brake disks/pads where most friction occurs on braking.

In an embodiment, the drawer 117 may be a lower part of an integral dust box 118 integrally formed with the caliper, but advantages are provided even with just a drawer 117 or receptacle incorporated in the brake 104', e.g. wherein the drawer 117 replaces a section of the caliper bridging the disks/pads.

In another embodiment box 118 is fixed directly on brake 104' structure. This has the advantage of being lighter, less sensitive to vibration, and having better strength in case of disk burst.

Dust or debris created by the brake disks drops down into the drawer 117 and is collected there. This mitigates jamming or damage of the brake components due to circulating dust or debris.

To access/empty the dust that has collected during braking, it is only necessary to remove the drawer 117 from the caliper and the drawer can be removed without having to remove the flexible connection or the tail rotor shaft.

Figure 9A:
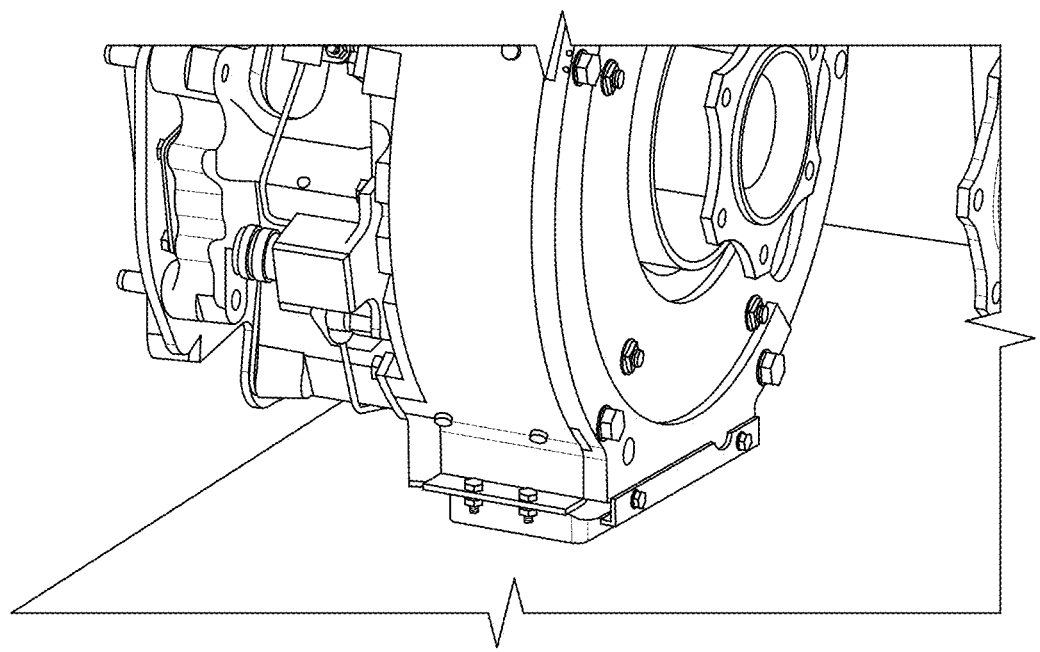
FIGS. 9A and 9B show a detail of FIG. 8.
Figure 9B:
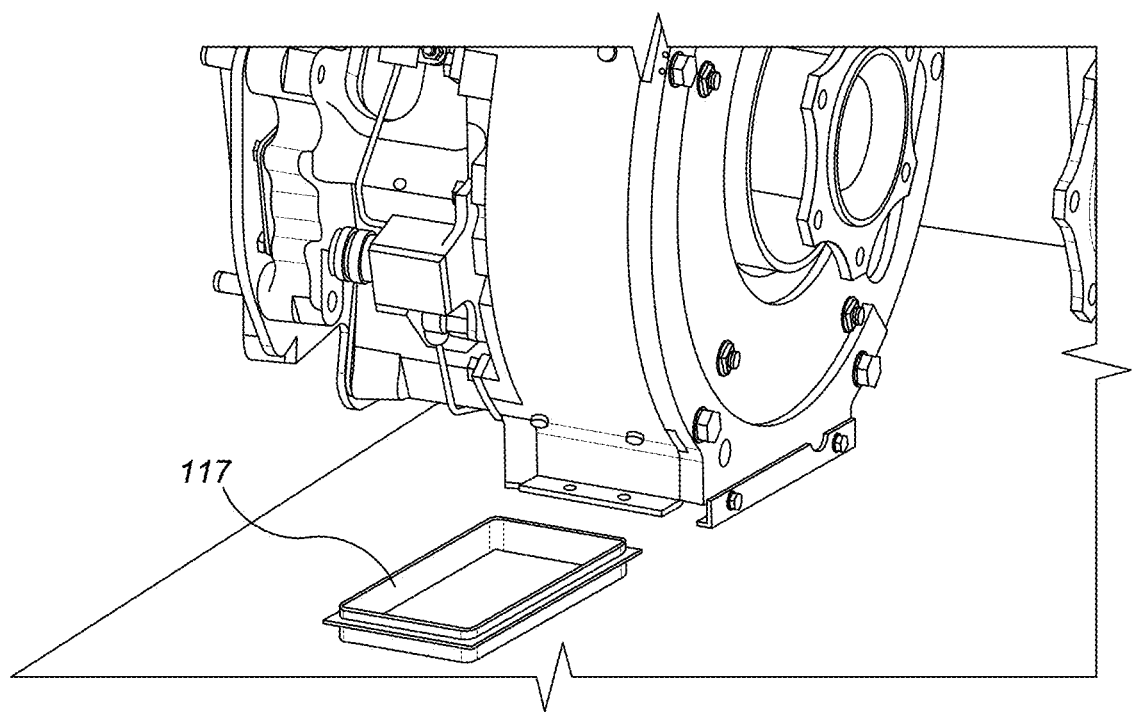
Figure 10A:
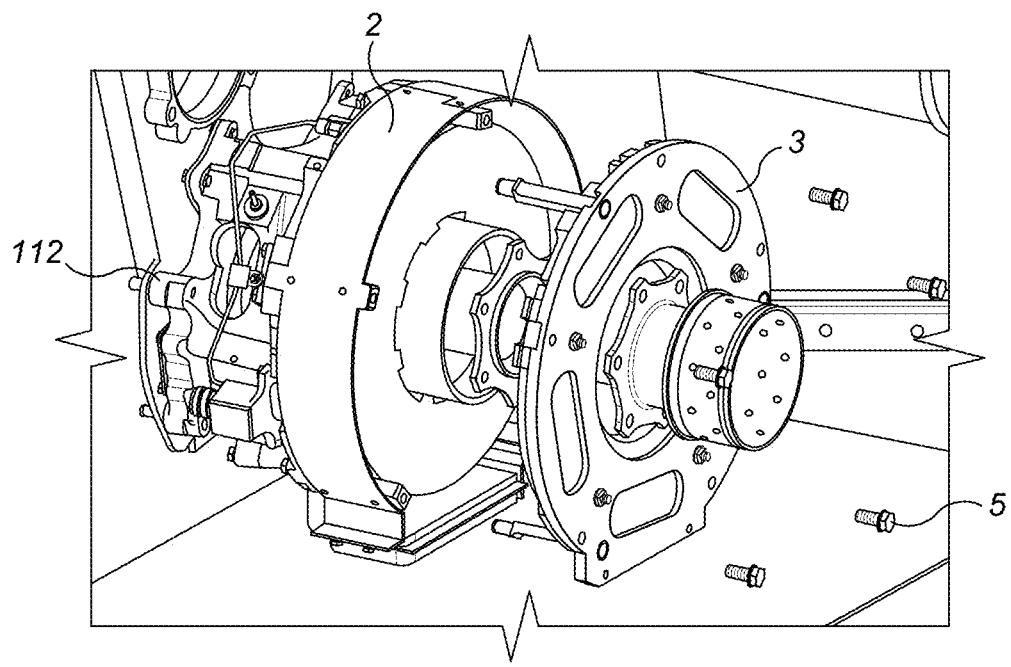
FIGS. 10A to 10D show how the components of the arrangement of FIG. 8 can be disassembled.
Figure 10B:
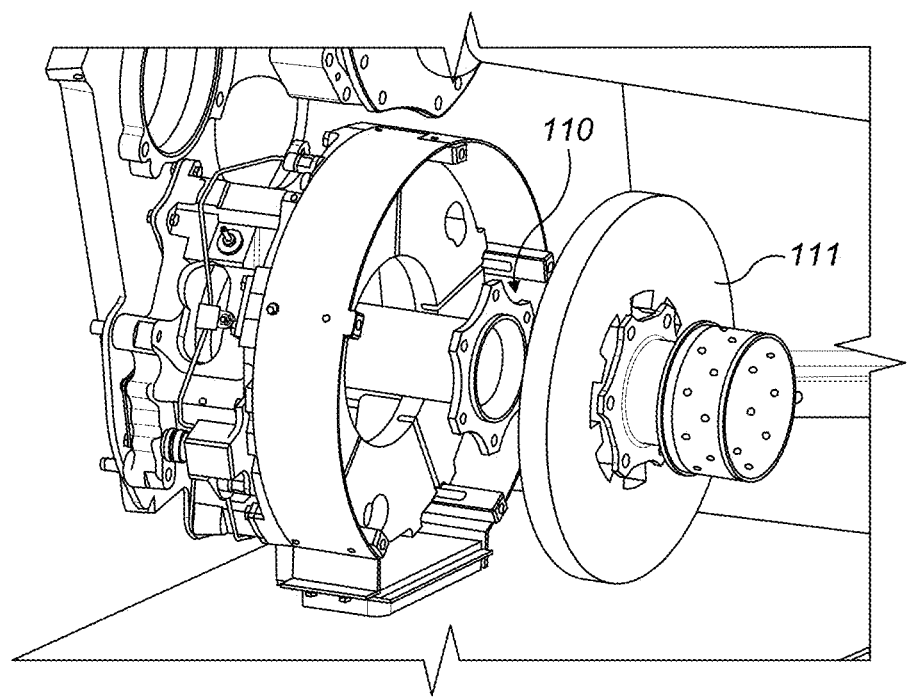
Figure 10C:
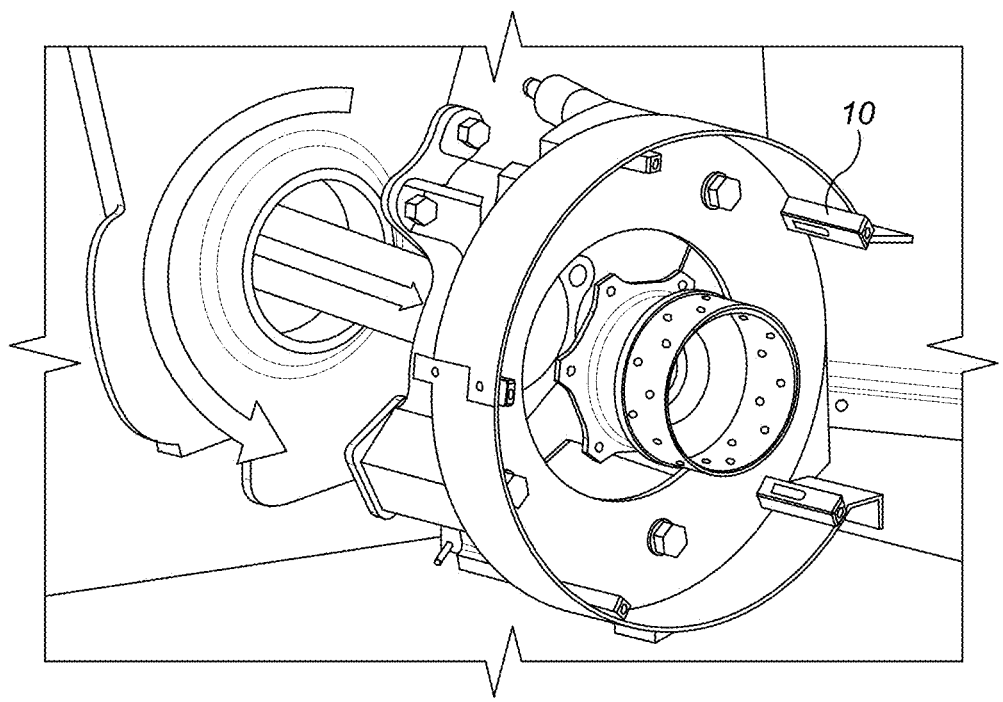
Figure 10D:
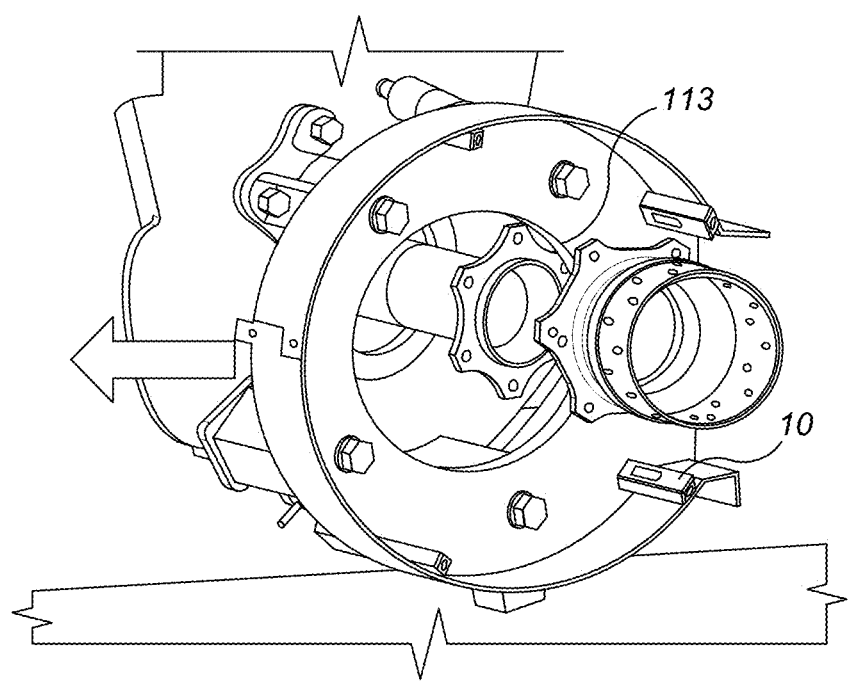
Figure 11:
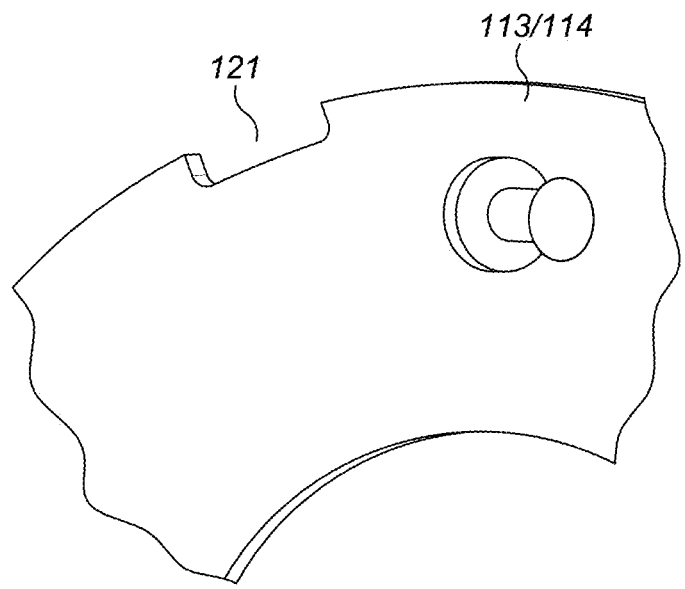
FIGS. 11 to 15 show how the components of a preferred embodiment rotor brake can be disassembled.

This can best be seen in FIGS. 9A and 9B, and is described further below.

Figure 6:
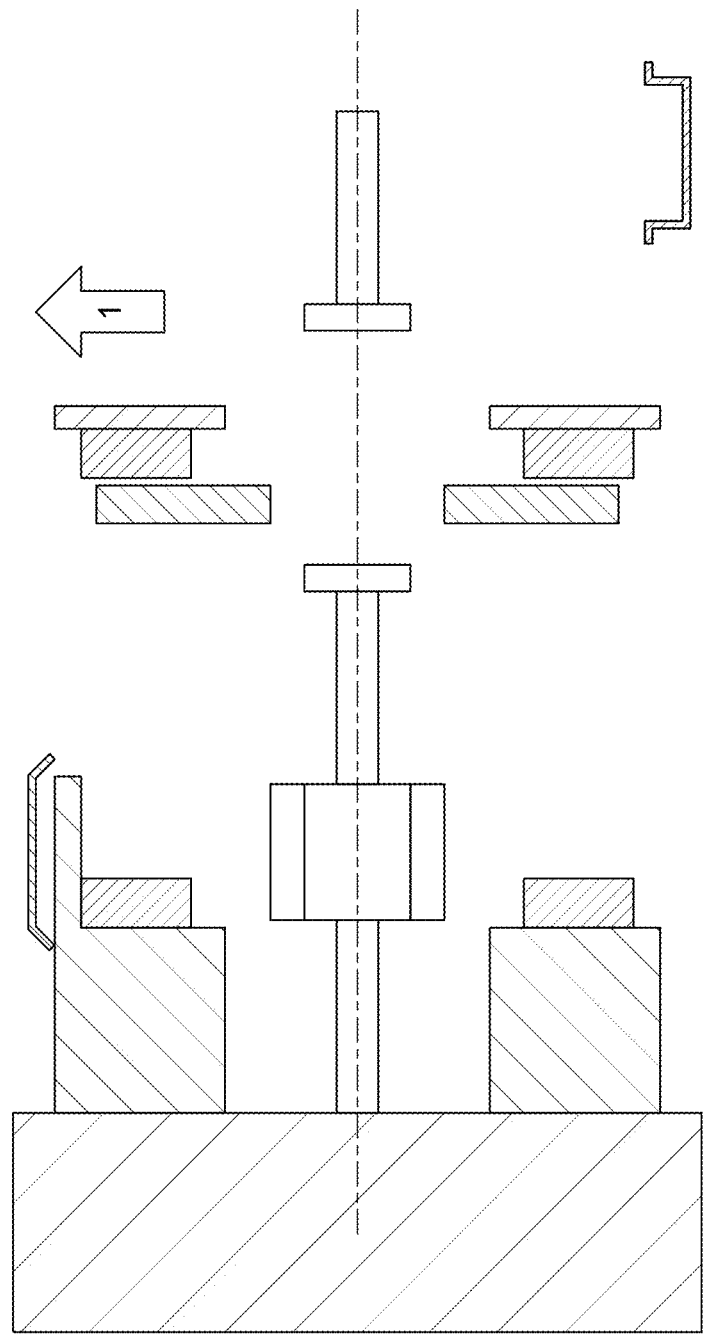
FIGS. 6 and 7 show stages of disassembling a rotor brake as in FIG. 5.
Figure 7:
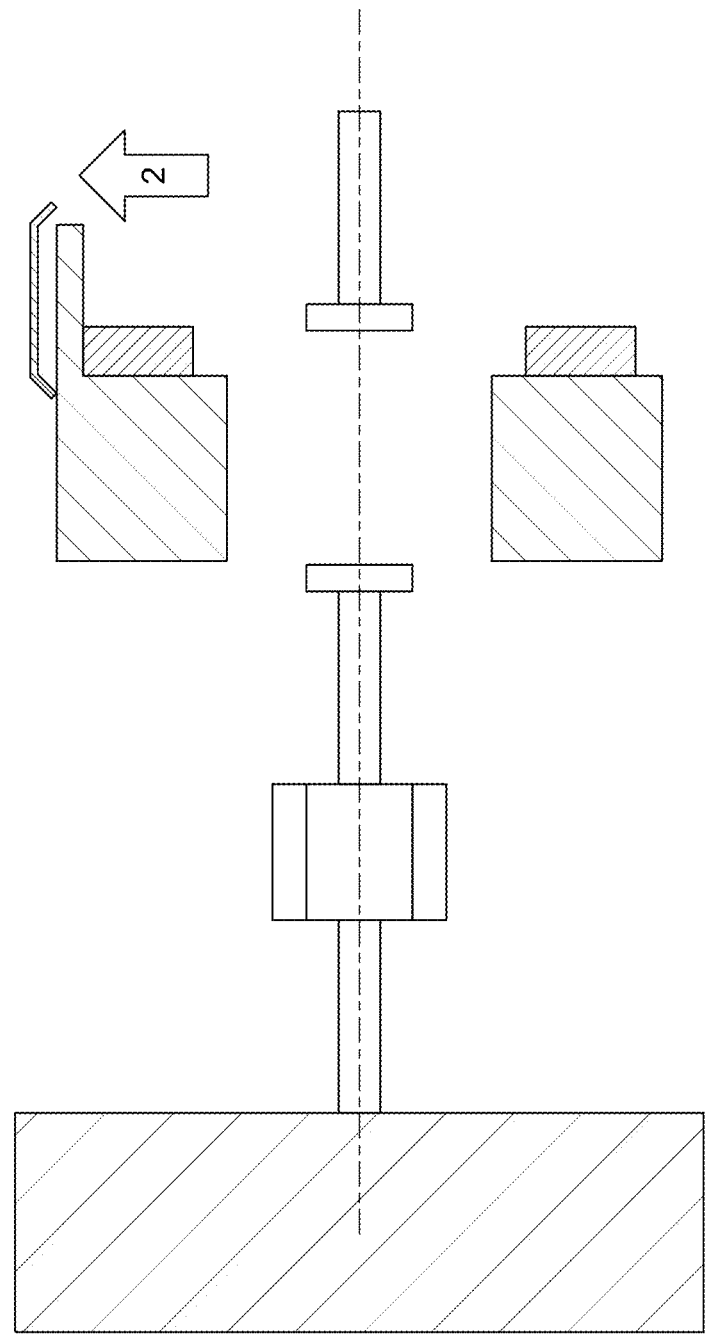

Furthermore, accessing and/or removing the brake is also considerably simplified as shown in FIGS. 6 and 7 as well as in FIGS. 10A-10D, and is also described further below.

In another aspect of this disclosure, described later with reference to FIGS. 11 to 15, a technique is described to enable a simplified removal of the brake disks without the need for special tools.

Figure 4:
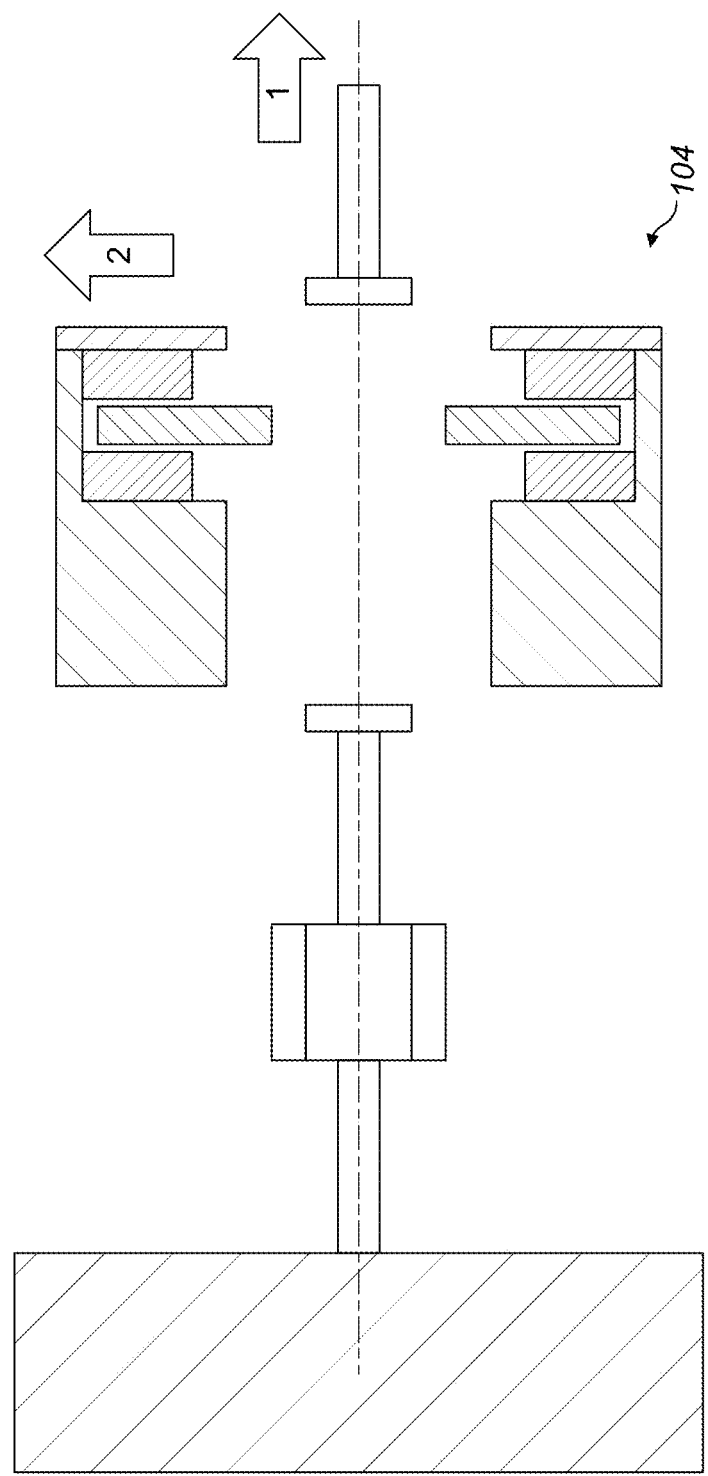

This technique can provide advantages in combination with the dust receptacle features of the disclosure above, or even in combination with conventional systems such as shown in FIGS. 2 to 4.

Figure 8:
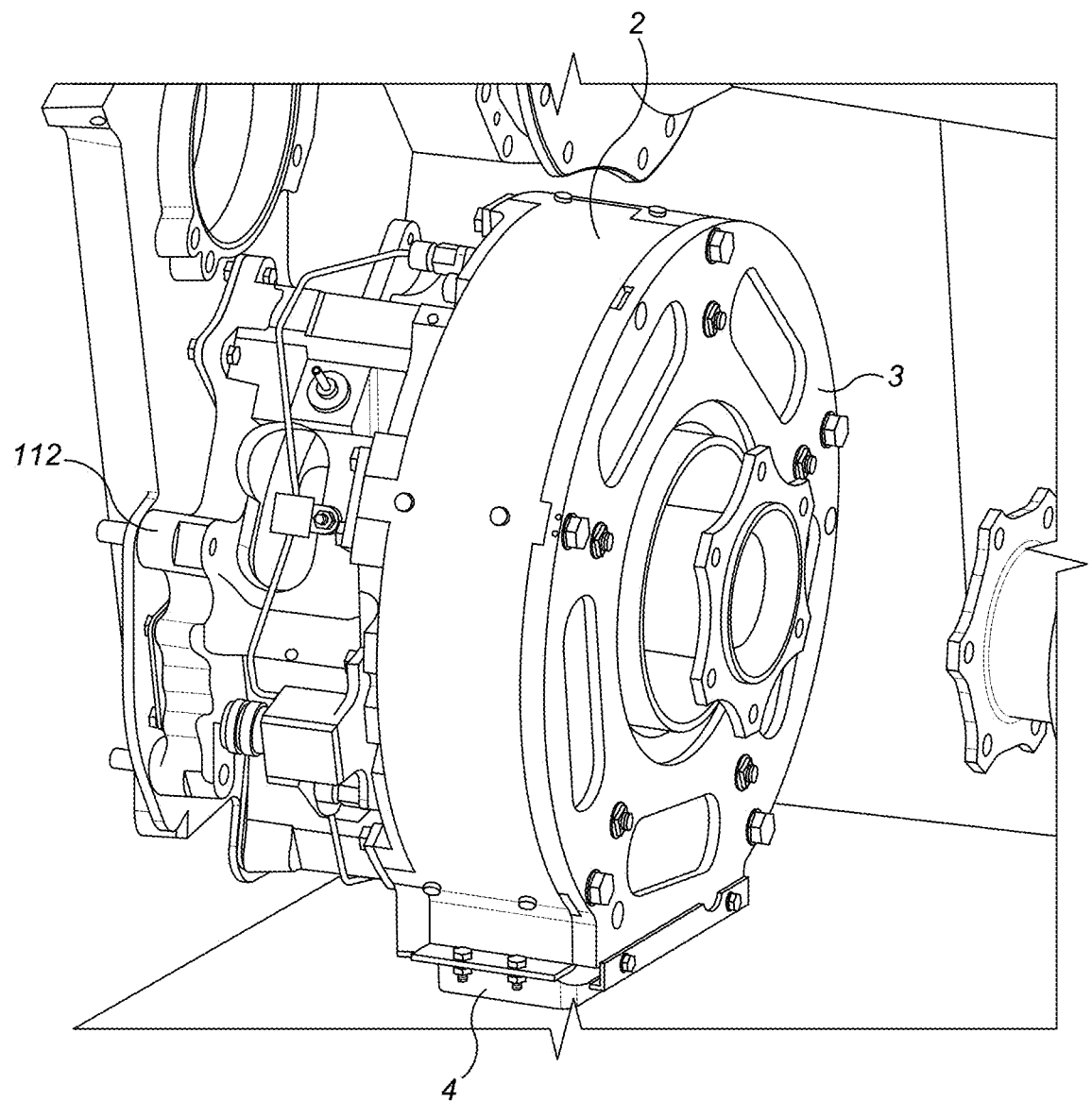
FIG. 8 is a perspective view of a brake system with integral dust retainer.

A perspective view of an integrated dust retaining arrangement is now described in more detail with respect to the perspective view of FIGS. 8 and 9. The same references are used for components shown in earlier figures. Mounted to the caliper 112 is the integrated dust retainer 2 of the disclosure, here in the form of a cylinder or drum extending from the caliper, and closed by a cover or cap 3. The cap 3 may replace the caliper cap 116. The combination of the caliper 112, the dust retainer box 2 and the dust retainer cap 3 defines a space within which the brake disks are located. This space forms the dust retainer assembly in which dust and debris is collected that is created due to operation of the brake. The dust retainer 2 and its cap are removable from the caliper 112 for maintenance, cleaning etc.

In a preferred embodiment, as described above, rather than having to remove the entire dust retainer every time it needs to be emptied of dust, the dust retainer can be provided with or can comprise an opening having a door or drawer 117. Dust will, due to gravity, fall to the bottom of the dust retainer, which is where such an opening would be provided. Periodically, the door or drawer can be opened or removed to discard the dust that has accumulated therein (see FIGS. 9A and 9B). This preferred feature simplifies maintenance and avoids excessive dust accumulation between full maintenance sessions.

The arrangement of the disclosure also greatly simplifies removal of the dust retainer from the brake system, so that the dust retainer itself can be repaired, replaced, cleaned etc. and also so that the brake components can be accessed and/or removed for repair, replacement, cleaning etc. The arrangement can be easily disassembled even in spaces where access is difficult or restricted. This can be seen with reference to FIGS. 10A to 10D.

First (not shown here) the flexible connection 109 needs to be undone. Then (FIG. 10A) the dust retainer cap 3 is removed. In the embodiment shown, this is fastened to the dust retainer drum by screws 5 but other means of fastening could, of course, be used. The fasteners are released so that the dust retainer cap can be pulled away from the assembly thus opening the space in which the brake disk is contained. If one set of the caliper brake pads 114 is mounted in the cap, this is removed with the cap 3.

In a next step (FIG. 10B) the floating disk 111 is removed e.g. by sliding out of the retainer e.g. along a shaft 110. In this embodiment, the floating disk 111 is attached to the shaft 110 by splines 10, as will be described further below, to simplify removal. In other designs, though, the attachment could be realised by clips or bolts or other fasteners.

The remaining caliper 112, with the dust retainer drum attached, and, in this embodiment, the second caliper plate or disk 113, is then removed (FIG. 10C, 10D) from the rotor system. In the embodiment shown, removal is by rotation and then a pulling action. If necessary, the retainer and the caliper pads 113 can then be removed from the caliper support body 2.

As mentioned above, a rotor brake caliper arrangement comprises at least one disk or pad which translates in order to compress the brake disk. The translation movement is usually generated by pistons (not shown). A pushing plate (not shown here—see FIG. 2A) may be located between the caliper pad(s) and the pistons.

The pistons (or other drive means), pushing plate (if any) and caliper pad(s) are connected together so that when the brake is released they move away from the floating disk 111, usually under a brake spring force.

The caliper disk is connected to the pistons (or pushing plate) and conventionally this may be by means of screws or bolts or by means of a clip mounted around the outer edge of the components. Such fasteners, however, can have drawbacks. If the brake system overheats, for example, screw threads can jam making assembly/disassembly difficult. Clips can be difficult to access for fastening or unfastening.

An additional advantageous feature of a separate aspect of the present disclosure, described with reference to FIGS. 11 to 15, is a way of fastening the caliper disk in a simpler manner that avoids the above problems, and avoids the need for special tools.

The caliper pads, in this preferred arrangement, are locked to the caliper support body 2 by means of a pin and slot arrangement, whereby slots are formed in the disk which engage with pins on the support body 2 or vice versa. The pins are provided with a shaft and an enlarged head. The slots are formed with a first portion having a diameter larger than that of the pin head and a second portion smaller than the pin head. The slots and pins are thus shaped such that in one rotational position, the pins are locked in and secured in the slots and in a second rotational position of the disk relative to the support body the pins slide axially out of the slots to release the disk from the caliper support body 2. If a pushing plate is provided, this can be attached/removed from the caliper body in the same way, as can a caliper disk or pad mounted in the dust retainer cap.

To remove the assembly components, first, the flexible connections are released. Then, the dust retainer cap (to which a caliper pad may be attached) is removed by releasing the fasteners (e.g. screws). The floating brake disk is then slid along the supporting splines for removal. The other caliper pad is secured to the caliper body in the locked position by the pins and slots. This disk is unlocked by rotating the disk to release the pins from the slots and the disk can also be removed. If a pushing plate is present, this can be locked/removed in a manner similar to the caliper pads.

Preferably, then, the locking direction of the pushing plate is opposite the locking direction of the caliper disk to avoid both being released together.

Whilst the slot and pin arrangement secures the components axially relative to each other, one problem is that if the components are rotated relative to each other, the pins can disengage from the slots so that the plates/disks can separate axially.

Figure 12:
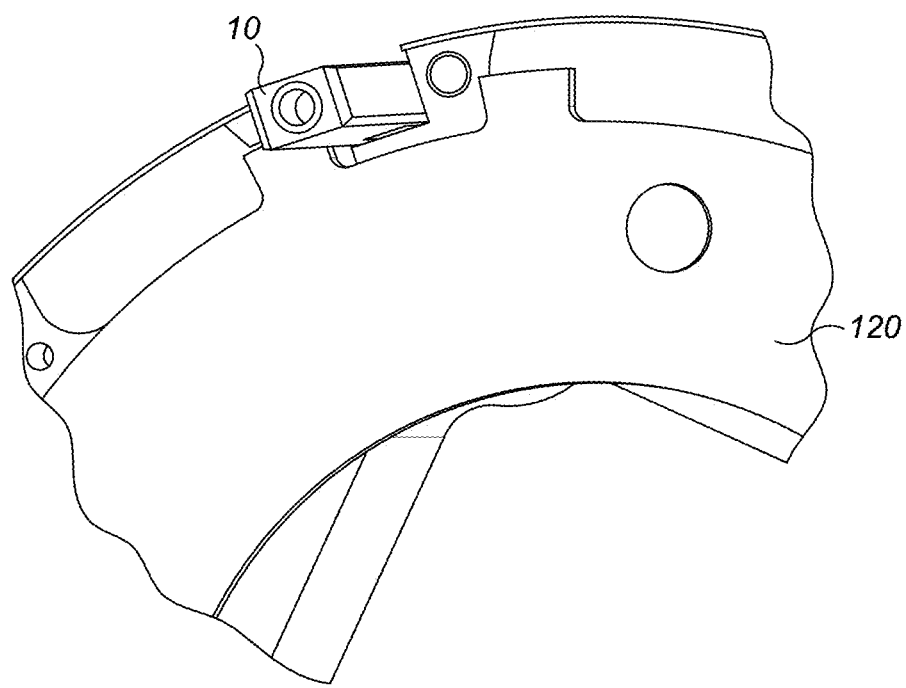

In this special aspect of attachment of the brake components, to allow tool-free replacement of the pads/disks, and to avoid inadvertent separation, the caliper pads (either or both of the fixed (114) and moveable (113) pads) are provided with a recess 121 to engage with a spline 10 or column provided on the inside surface of the caliper body 2. In embodiments with a pushing plate 120, the pushing plate has the recess 121. FIG. 12 shows a pushing pate 120 (although this could be a brake pad 113) mounted to the caliper via engagement of the recess 121 and column 10.

To install the pad/pushing plate, it is presented to the caliper parallel to the floating disk axis so the recess 121 fits over the column 10 as the pin engages through the larger portion of the slot and the pad/pushing pate is then rotated slightly in one direction (e.g. clockwise) to provide a contact point between the slot and one side of the column and so that the pin engages in the smaller portion of the slot.

Figure 13:
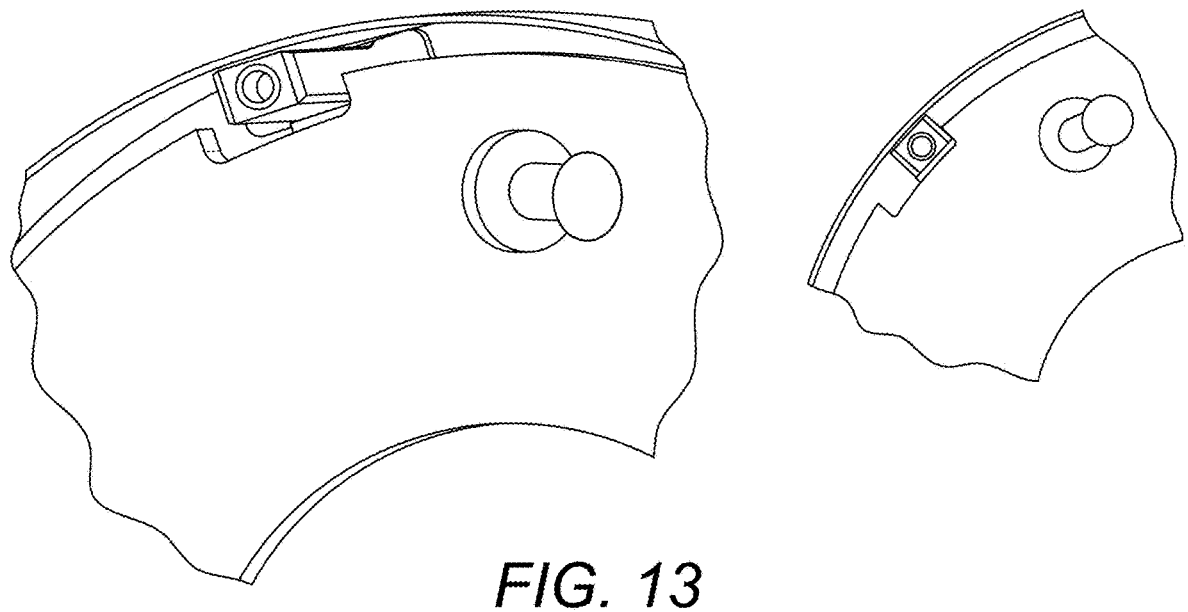
Figure 14:
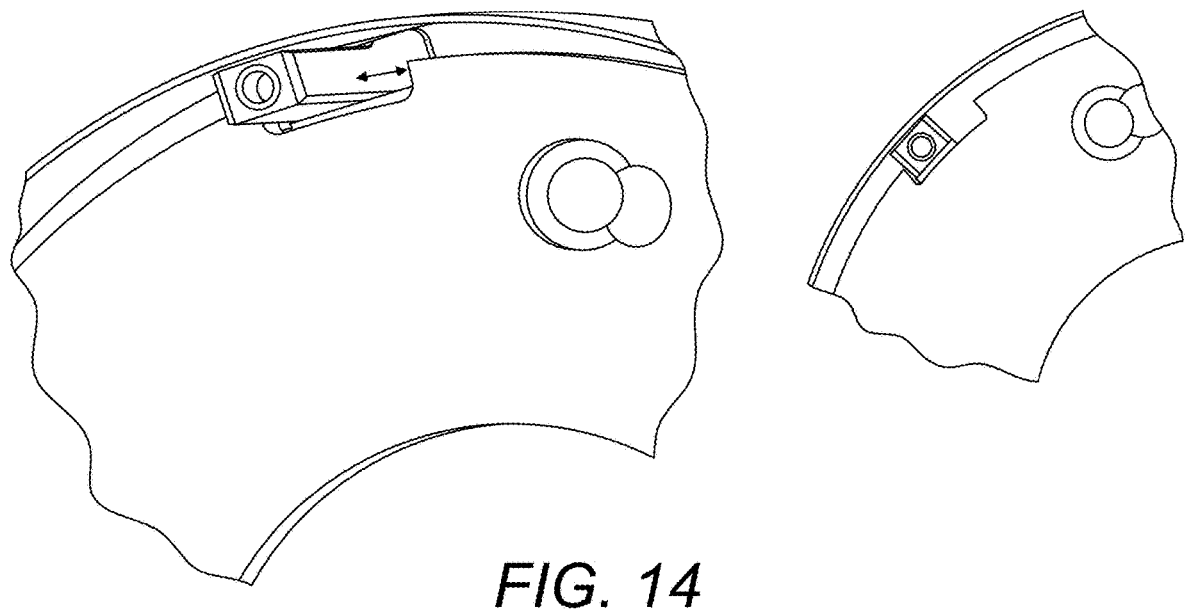
Figure 15:
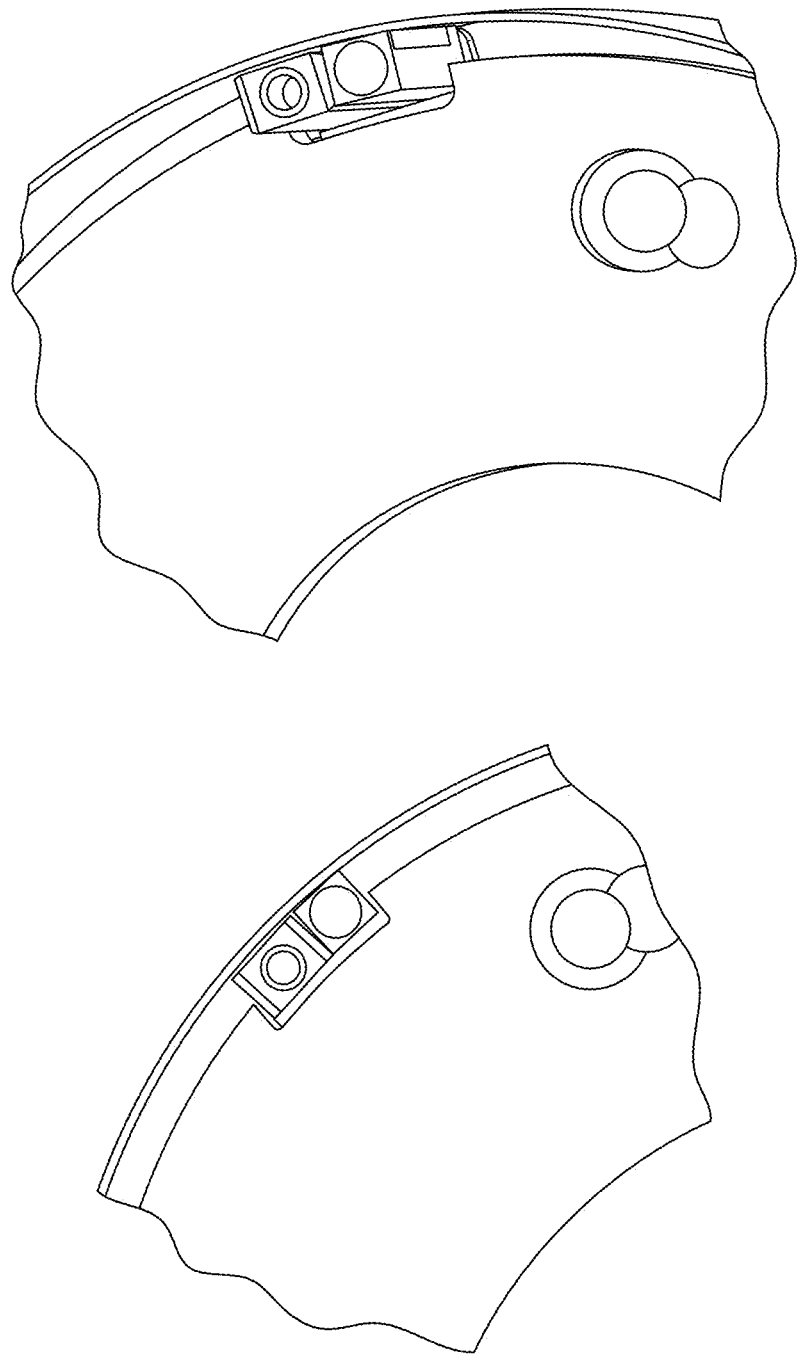

If, however, a rotation were to be applied in the opposite direction (e.g. counter-clockwise), the plate/pad could return to the non-contacted position of FIG. 13 which would give rise to a risk of contact during flight. To avoid this, a locking axis is installed inside the gap between the recess and the column at the side opposite the first contact point (FIG. 15) ensuring that the plate/pad is held axially and able to withstand torque in both directions. In the above, clockwise and counter-clockwise could of course be reversed.

In the embodiment shown, the column and locking axis are in the same slot. This is preferred, as, if the locking axis bends due to braking torque, it will contact the column and deflection will be limited. In other embodiments, however, the column and locking axis can use two separate recesses.

Although only one column is shown in FIGS. 11 to 15, in practice, several will be provided around the caliper.

This mechanism can be used to attach the fixed pads 114, the moveable pads 113 and/or a pushing plate 120. With the fixed pads 114, the support 116 would have shouldered pins, and the pad/disk would be presented to the support so the slots fit over the pins; the pad/disk is rotated to lock over the pins. Recesses on the circumference of the fixed pad 114 (like in FIGS. 11 to 15) fix the support to the caliper by engagement of locking axis and column and recesses (as described above) to lock the pads in place.

The dust retainer assembly of the present disclosure, in being integrally mounted to the brake system rather than in the form of an enclosure around the brake system greatly simplify the assembly and disassembly of and access to the components of the system.

This securing arrangement could provide advantages in brake assemblies even without an integral dust retainer, to simplify assembly/disassembly.

The recess/column locking arrangement, in itself, simplifies installing/disassembling the brake components.

The invention claimed is:
1. A brake assembly comprising:
two disk components removably mounted about an axis,
fastening means for securing said two disk components together, said fastening means configured to enable the components to be separated from each other by rotating one of said two disk components relative to the other and then axially moving one of the two disk components away from the other of the two disk components;
whereby the fastening means comprises a spline arranged on the one of the two disk components and a corresponding recess on the another of the two disk components arranged to receive the spline such as to define a gap between the spline and an edge of the recess, and further comprising a component defining a locking axis arranged to engage in the gap to prevent relative rotation of the components;
whereby the fastening means further comprises a pin arranged on the one of the two disk components and a slot arranged on the other of the two disk components, the pin having a shaft and an enlarged head, the slot comprising a first portion having a diameter larger than the head and a second portion smaller than the head, whereby the two disk components are axially secured to each other by rotating the two disk components relative to each other to engage the pin with the slot and to secure the pin in the second portion.

* * * * *